United States Patent
Burmester et al.

(10) Patent No.: US 6,561,812 B1
(45) Date of Patent: May 13, 2003

(54) SYSTEM AND METHOD OF CORRELATING LEARNING MATERIALS WITH EDUCATIONAL OBJECTIVES

(75) Inventors: Christopher Paul Burmester, Kensington, CA (US); Mary E. Dietz, San Ramon, CA (US); Michael Graves, San Jose, CA (US); Corinne Wayshak, Los Altos, CA (US)

(73) Assignee: LearnCity, Inc., San Ramon, CA (US)

( * ) Notice: Subject to any disclaimer, the term of this patent is extended or adjusted under 35 U.S.C. 154(b) by 153 days.

(21) Appl. No.: 09/699,797

(22) Filed: Oct. 30, 2000

(51) Int. Cl.[7] .................................................. G09B 5/00
(52) U.S. Cl. .................................... 434/365; 434/307 R
(58) Field of Search ................................. 434/350, 322, 434/323, 307 R, 118, 362, 365, 169; 706/397

(56) References Cited

U.S. PATENT DOCUMENTS

| | | | |
|---|---|---|---|
| 5,036,473 A | 7/1991 | Butts et al. | 364/489 |
| 5,109,433 A | 4/1992 | Notenboom | |
| 5,204,960 A | 4/1993 | Smith et al. | 395/700 |
| 5,278,751 A | 1/1994 | Adiano et al. | 364/402 |
| 5,308,244 A | 5/1994 | Hirose | 434/169 |
| 5,316,485 A | 5/1994 | Hirose | 434/322 |
| 5,470,233 A | 11/1995 | Fruchterman et al. | 434/112 |
| 5,810,605 A | 9/1998 | Siefert | 434/362 |
| 5,823,789 A | 10/1998 | Jay et al. | 434/365 |
| 5,829,983 A | 11/1998 | Koyama et al. | 434/118 |
| 6,149,441 A | 11/2000 | Pellegrino et al. | 434/350 |
| 6,270,351 B1 | 8/2001 | Roper | 434/118 |

OTHER PUBLICATIONS

Martin G. Brooks, "The Case for Constructivist Classrooms" 1993, pp. 1–136.

Grant Wiggins et al., "Understanding by Design" 1998, pp. 1–201.

John S. Kendall et al., "Content Knowledge: A Compendium of Standards and Benchmarks for K–12 Education" Mid–continent Regional Educational Laboratory, Inc. 1996, pp. 1–2.

Ruth Mitchell, "Testing for Learning: How New Approaches to Evalution can Improve American Schools" 1992, 9 pages.

P. David Pearson, "Standards for the English Language Arts: A Policy Perspective" Journal of Reading Behavior, 1993, vol. 25, No. 4, pp. 457–475.

Daniel P. Resnick, "Standards, Curriculum, and Performance: A Historical and Comparative Perspective" Education Researcher, Apr. 1985, pp. 5–20.

Grant Wiggins "Practicing What we Preach in: Designing Authentics", Educational Leadership, Dec. 1996/Jan. 1997, pp. 380–387.

*Primary Examiner*—Joe H. Cheng
*Assistant Examiner*—Kathleen M Christman
(74) *Attorney, Agent, or Firm*—Haverstock & Owens LLP

(57) ABSTRACT

A method of generating a correlation between a plurality of sets of educational requirements and learning activities, and identifying the educational requirements to which a learning component of the learning activities is correlated. Teachers and authors accessing the correlating system are able to author and select learning components to be correlated to the plurality of educational requirements sets. An educational requirements set can be a set of state educational standards, a set of school district educational standards or a set of corporate training or certification requirements. The correlation of educational components to the grouping of educational requirements and of learning components to a set of educational components are generated and stored by a server, preferably accessible over the internet through the public switched telephone network. Using the correlation system of the present invention, teachers and authors have the ability to develop lesson plans which are correlated to standards within the plurality of sets of educational requirements.

43 Claims, 9 Drawing Sheets

SYSTEM AND METHOD OF CORRELATING LEARNING MATERIALS WITH EDUCATIONAL OBJECTIVES

FIELD OF THE INVENTION

The present invention relates to the field of systems for correlating sets of educational requirements. More particularly, the present invention relates to the field of systems for correlating learning activities to multiple sets of educational requirements.

BACKGROUND OF THE INVENTION

Increasingly, teachers and school systems are called upon to align student learning activities with explicit educational objectives, such as state educational standards. Teachers' course and lesson plans need to address individual components of such objectives, and school systems need to be able to demonstrate that learning activities have successfully addressed those objectives.

These requirements call upon teachers and school administrators to provide some form of accountability system furnishing documentation of alignment of learning activities to objectives at the level of individual learning activities. Curriculum and instruction must be aligned to objectives set forth in education standards and data must be provided as evidence that students are achieving learning outcomes expressed in the standards.

Publishers or authors of learning activities, from individual teachers to national publishers, need to be able to provide learning materials with integrated correlation data. Doing so enables teachers to use those materials with knowledge that they have been correlated to the relevant objectives they need to address.

Correlations are local in nature. That is, individual states (and in some cases individual school districts or even schools themselves) will adopt their own sets of educational objectives, to which teachers in those states or other areas must adhere. Thus, any learning materials meant to be used across states and school districts must be correlated to multiple sets of learning objectives in order to include the relevant objectives for any particular teacher's or school's use.

In addition to satisfying public school education requirements associated with learning objectives (e.g. state mandated standards), correlations of learning materials with very specific learning objectives can provide value to all learners and teachers, including those involved in private education, corporate education, home schooling, etc.

U.S. Pat. No. 5,823,789 discloses a system for correlating educational requirements, or standards sets, to lesson plans of educators. Additionally, the system correlates the same educational requirements to education resources. The educational requirements, lesson plans, and education resources are correlated via a single independent layer. The independent layer is comprised of statements describing educational content. Teachers, or other lesson plan authors, manually correlate lesson plan content to the statements. Similarly, the standards sets contain components, the components are also manually correlated with the statements. Thus, via the independent layer as intermediary and common currency, a correlation between lesson plans and standards within standards sets is accomplished. Further, education resources can be correlated to statements in the independent layer, thereby entering into the overall correlation scheme. Just as lesson plans can be correlated to standards via the independent layer intermediary, so can resources be correlated to the standards. Teachers are able to choose resources on the basis of the standards which they address. In this manner, the independent layer with accompanying statements acts as a hub in a correlation process between components of standards sets, lesson plans, and education resources.

A problem with the independent layer design is the cumbersome and tedious nature of the many-to-many correlation scheme. Standards sets may consist of hundreds of components correlating to nearly as many statements. The task of directly correlating a lesson plan to such an ungainly number of statements often times proves very time consuming and inefficient.

Another problem with the independent layer design is that only a single layer is provided. When multiple sets of standards need to be correlated to, the single layer design does not provide any aggregation of the multiple sets into related and manageable intermediate layers. Without such aggregation, the complexity of correlating a lesson plan to multiple standards sets is multiplied many-fold over the process of correlating a lesson plan to the hundreds of components of a single standards set.

SUMMARY OF THE INVENTION

A system and method of correlating learning materials with educational objectives generates a correlation between a plurality of sets of educational requirements and learning activities, and identifies the educational requirements to which a learning component of the learning activities is correlated. Teachers and authors accessing the correlating system are able to author and select learning components to be correlated to the plurality of educational requirements sets. An educational requirements set is a set of state educational standards, a set of school district educational standards or a set of corporate training or certification requirements. The correlation of educational components to the grouping of educational requirements and of learning components to a set of educational components are performed and stored by a server, preferably accessible over the internet through the public switched telephone network. Using the correlation system of the present invention, teachers and authors have the ability to develop lesson plans which are correlated to standards within the plurality of sets of educational requirements.

In one aspect of the present invention, a method of generating a correlation between a plurality of sets of educational requirements and learning activities includes the steps of aggregating educational requirements from one or more of the sets of educational requirements into a grouping of educational requirements having a common factor, generating a set of educational components including the educational requirements within the grouping, correlating the set of educational components to the grouping of educational requirements to generate a first set of correlations, and correlating a learning component of the learning activities to one or more educational components of the set of educational components to generate a second set of correlations. The steps of correlating the set of educational components to the grouping of educational requirements and correlating the learning component of the learning activities to the set of educational components are performed by a server. The step of correlating the learning component of the learning activities to one or more educational components of the set of educational components further comprises the step of manually selecting the educational components to which the learning component is correlated. The grouping, the set of educational components, the first set of correlations, and the second set of correlations are stored on a storage device coupled to the server. Preferably, the storage device is a database. The database is distributed into more than one physical location. The method further includes the step of establishing an internet connection with the server to provide and select the learning components to be correlated. The internet connection is established with a computer system at a remote location from the server. The learning components of the learning activities are lesson plans generated by teachers or authors. The learning components are generated by an authoring tool coupled to the storage device. A set of educational requirements is a set of state educational standards, a set of school district educational standards, or a set of corporate training requirements.

In another aspect of the present invention, a method of identifying educational requirements within a plurality of sets of educational requirements correlated to a learning component of a learning activity includes the steps of aggregating educational requirements from one or more of the sets of educational requirements into a grouping of educational requirements having a common factor, generating a set of educational components including the educational requirements within the grouping, correlating the set of educational components to the grouping of educational requirements to generate a first set of correlations, correlating the learning component of the learning activities to one or more educational components of the set of educational components to generate a second set of correlations, identifying educational components within the set of educational components by applying the second set of correlations to the learning component of the learning activities, and identifying educational requirements within the grouping of educational requirements by applying the first set of correlations to the identified educational components of the set of educational components. The steps of correlating the set of educational components to the grouping of educational requirements and correlating the learning component of the learning activities to the set of educational components are performed by a server. The steps of identifying educational components and identifying educational requirements are performed by the server. The step of correlating the learning component of the learning activities to one or more educational components of the set of educational components further comprises the step of manually selecting the educational components to which the learning component is correlated. The grouping, the set of educational components, the first set of correlations, and the second set of correlations are stored on a storage device coupled to the server. Preferably the storage device is a database. The database is distributed into more than one physical location. The method further includes the step of establishing an internet connection with the server to select the learning component to be correlated. The learning component of the learning activities is a lesson plan generated by teachers or authors. The learning component is generated by an authoring tool wherein the authoring tool is coupled to the storage device. The method further comprises the step of establishing an internet connection with the server to utilize the authoring tool.

In yet another aspect of the present invention, a correlating system for generating correlations between a plurality of sets of educational requirements and learning activities includes means for aggregating educational requirements from one or more of the sets of educational requirements into a grouping of educational requirements having a common factor, means for generating a set of educational components including the educational requirements within the grouping, means for correlating the set of educational components to the grouping of educational requirements to generate a first set of correlations, and means for correlating a learning component of the learning activities to one or more educational components of the set of educational components to generate a second set of correlations. The means for generating sets of correlations is included within a server. The means for correlating a learning component of the learning activities to one or more educational components of the set of educational components further comprises means for manually selecting the educational components to which the learning component is correlated. A connection is established with a computer system and the server to access the correlating system and to provide and select the learning components to be correlated. The connection is established between the computer system and the server over the internet. The correlating system further includes means for storing the grouping, the set of educational components, the first set of correlations, and the second set of correlations.

In still yet another aspect of the present invention, a correlating system for generating correlations between a plurality of sets of educational requirements and learning activities includes an interface circuit configured to establish a connection with a remote computer system, and a correlating server coupled to the interface circuit to aggregate educational requirements from one or more of the sets of educational requirements into a grouping of educational requirements having a common factor, provide a set of educational components, correlate the set of educational components to the grouping of educational requirements to generate a first set of correlations, and correlate a learning component of the learning activities to one or more educational components of the set of educational components to generate a second set of correlations. The correlating system further includes a storage device coupled to the correlating server to store the grouping, the set of educational components, the first set of correlations, and the second set of correlations. The connection is established with the remote computer system and the interface circuit over the internet to allow users to access the correlating server and to provide and select the learning components to be correlated.

In another aspect of the present invention, a network of devices for generating correlations between a plurality of sets of educational requirements and learning activities includes one or more computer systems configured to communicate with other systems, and a correlating server configured to couple to the one or more computer systems to aggregate educational requirements from one or more of the sets of educational requirements into a grouping of educational requirements having a common factor, provide a set of educational components, correlate the set of educational components to the grouping of educational requirements to generate a first set of correlations, and correlate a learning component of the learning activities to one or more educational components of the set of educational components to generate a second set of correlations. The network of devices further includes a storage device coupled to the correlating server to store the grouping, the set of educational components, the first set of correlations, and the second set of correlations. The one or more computer systems and the correlating server are coupled together over the internet to allow users to access the correlating server and to provide and select the learning components to be correlated.

In yet another aspect of the present invention, a method of generating a correlation between a learning component of a learning activity and a plurality of sets of educational requirements includes the steps of selecting one or more educational components to which the learning component is correlated, correlating the learning component to the selected educational components to generate a first set of correlations, correlating the selected educational components to one or more groupings of educational requirements having a common factor to generate a second set of correlations, and correlating the one or more groupings to the plurality of sets of educational requirements to generate a third set of correlations. The step of selecting one or more educational components is performed manually. The steps of correlating the learning component to the selected educational components, correlating the selected educational components to one or more groupings of educational requirements having a common factor, and correlating the one or more groupings to the plurality of sets of educational requirements are performed by a server. The selected educational components, the first set of correlations, the second set of correlations, and the third set of correlations are stored on a storage device coupled to the server. The method further includes the step of establishing an internet connection with the server to select the educational components to be correlated. The learning component of the learning activities is a lesson plan generated by teachers or authors.

DETAILED DESCRIPTION OF THE PREFERRED EMBODIMENT

The correlating system of the present invention defines a layer of learning objectives which is independent of individual sets of standards and which lies between learning materials and those sets of standards to provide a medium through which lesson plans are correlated to those multiple sets of standards, at the same time preserving or even augmenting the specificity of those correlations.

Using the correlating system of the present invention, a teacher or an author creates a lesson plan using an authoring module. While the preferred embodiment of the present invention is used to create lesson plans related to levels kindergarten through high school, it should be apparent to those skilled in the art, that the correlating system can alternatively be used to create learning activities related to any type and level of learning environment including public education, private education, corporate education, and home schooling. Additionally, while the correlating system will most likely be used by teachers or authors of educational materials, it should be apparent that any individual or group interested in creating learning activities can utilize the correlating system of the present invention.

The teacher selects buckets, or groupings of educational requirements, and learning outcomes, or educational components of the buckets, to be addressed by the newly created lesson plan. A correlation module then creates sets of correlations between the lesson plan and a desired set or sets of educational requirements. Once the correlation process is performed, the result is a lesson plan that is correlated to the learning outcomes, the buckets, and any number of sets of educational requirements. The correlation sets and the lesson plan are stored in a storage device and are accessed through a storage module. The stored elements are also used within a tracking module and a planning workspace module. Teachers create entire course plans in the planning workspace module by importing existing lesson plans from the storage device or by creating new lesson plans in the authoring module. The course plan includes one or more lesson plans and the planning workspace module utilizes the correlation sets to determine the level of completeness to which a course plan meets the desired sets of educational requirements. The tracking module provides the ability to record and view student performance records as related to course plans, lesson plans, and educational requirements.

Figure 1:
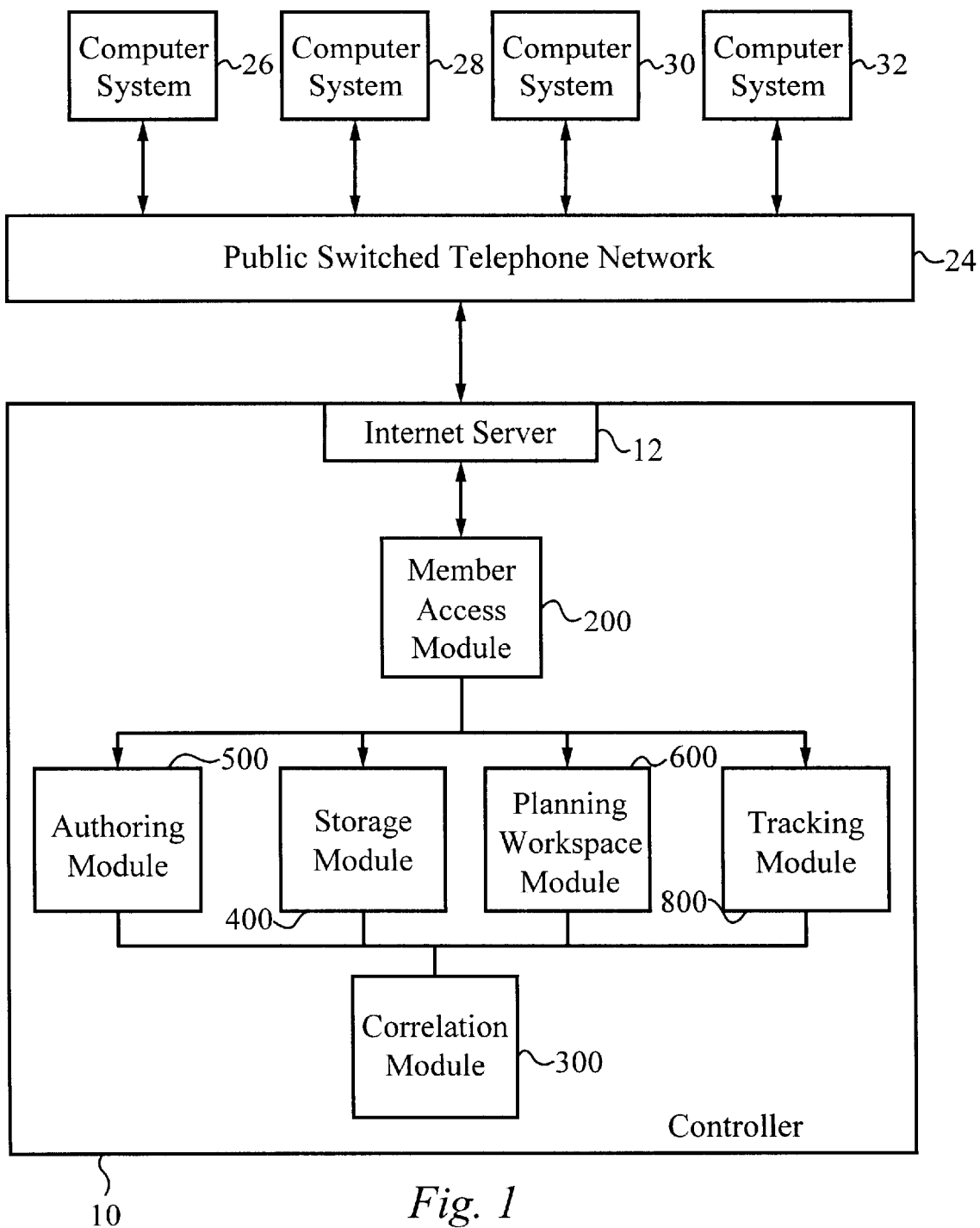
FIG. 1 illustrates a block diagram of a correlating system according to the preferred embodiment of the present invention.

A block diagram of a correlating system according to the preferred embodiment of the present invention is illustrated in FIG. 1. A controller 10 includes an internet server 12, a member access module 200, an authoring module 500, a storage module 400, a planning workspace module 600, a tracking module 800, and a correlation module 300. The member access module 200 is coupled to the authoring module 500, to the storage module 400, to the planning workspace module 600, and to the tracking module 800 to control communications between the controller 10 and users accessing the correlating system. As used herein, the term user includes one or more of an individual, group of individuals, association, corporation, agency, or any other person or entity accessing the correlating system to create and select lesson plans. Preferably, the user is a teacher or an author of educational material, but it should be clear that any user is capable of using the system.

The correlation module 300 is coupled to the authoring module 500, to the storage module 400, to the planing workspace module 600, and to the tracking module 800 to generate the necessary correlations between educational requirements and learning activities.

The controller 10 is coupled to the public switched telephone network 24 to allow communications between the internet server 12 and the users' computer systems 26–32. Using the computer systems 26–32, users have the ability to establish a connection with the member access module 200 to create lesson plans, to organize course plans, and to view overall course coverage as related to desired educational requirements. Preferably, this connection is established between the users' computer systems 26–32 and the controller 10 over the internet through the public switched telephone network 24. Alternatively, this connection is established by any appropriate connection including a direct connection over the public switched telephone network 24.

Figure 2:
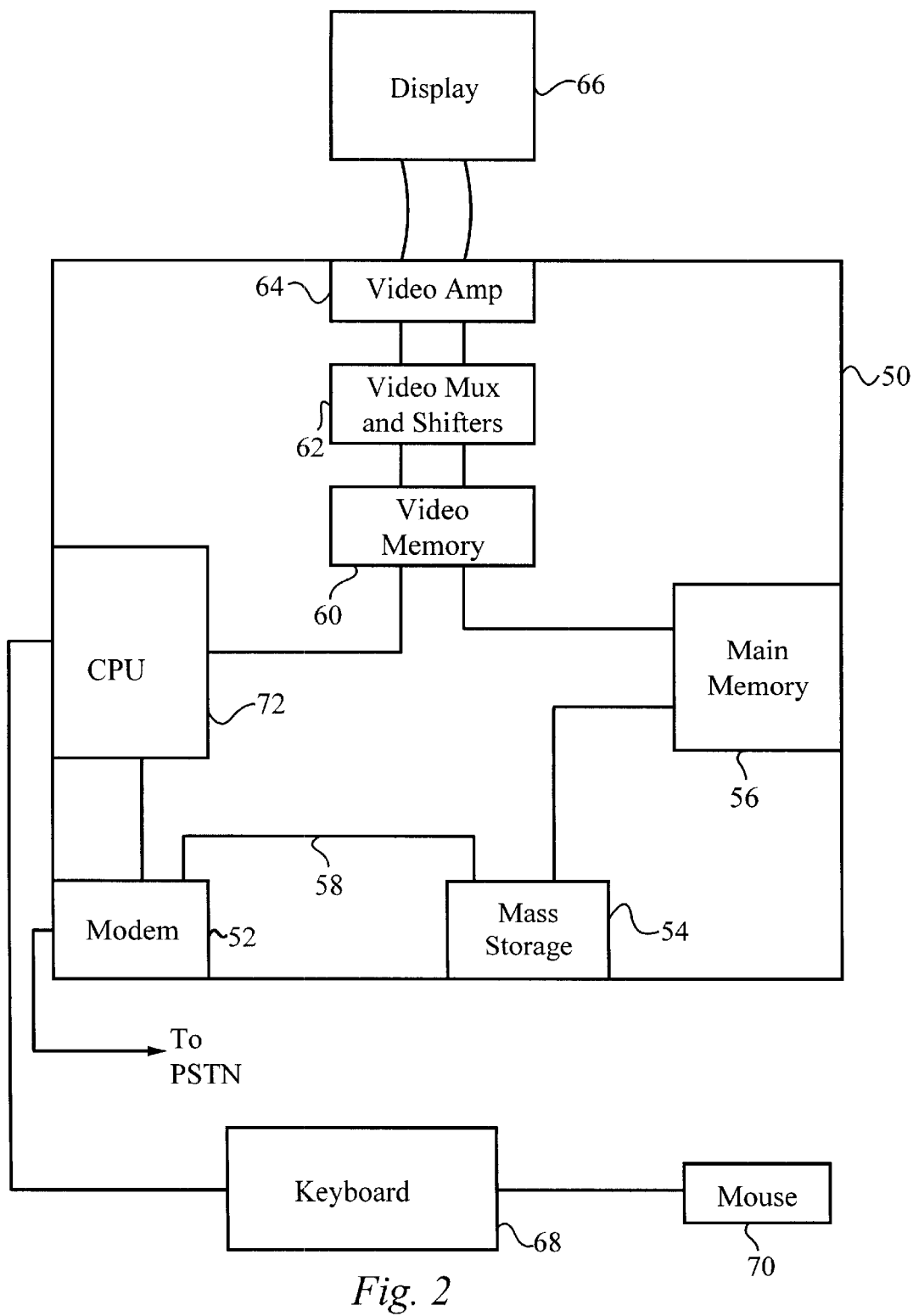
FIG. 2 illustrates a block diagram of the internal components of the computer systems used to access the correlating controller of the preferred embodiment of the present invention.

A block diagram of the internal components of the computer systems 26–32 used by users to access the controller 10 of the present invention is illustrated in FIG. 2. While the controller 10 can be accessed from any appropriately configured computer system or internet access device, an exemplary computer system 50 for accessing the controller 10 is illustrated in FIG. 2. The exemplary computer system 50 includes a CPU 72, a main memory 56, a video memory 60, a mass storage device 54 and a modem 52, all coupled together by a conventional bidirectional system bus 58. The modem 52 is preferably coupled to the public switched telephone network 24 for sending and receiving communications. The mass storage device 54 may include both fixed and removable media using any one or more of magnetic, optical or magneto-optical storage technology or any other available mass storage technology. The system bus 58 contains an address bus for addressing any portion of the memory 54, 56 and 60. The system bus 58 also includes a data bus for transferring data between and among the CPU 72, the main memory 56, the video memory 60, the mass storage device 54 and the modem 52.

The computer system 50 is also coupled to a number of peripheral input and output devices including the keyboard 68, the mouse 70, and the associated display 66. The keyboard 68 is coupled to the CPU 72 for allowing a user to input data and control commands into the computer system 50. A conventional mouse 70 is coupled to the keyboard 68 or computer system 50, directly, for manipulating graphic images on the display 66 as a cursor control device in a conventional manner. The display 66 displays video and graphical images generated by the computer system 50.

A port of the video memory 60 is coupled to a video multiplex and shifter circuit 62, which in turn is coupled to a video amplifier 64. The video amplifier 64 drives the display 66, when it is being used. The video multiplex and shifter circuitry 62 and the video amplifier 64 convert pixel data stored in the video memory 60 to raster signals suitable for use by the display 66.

Figure 3:
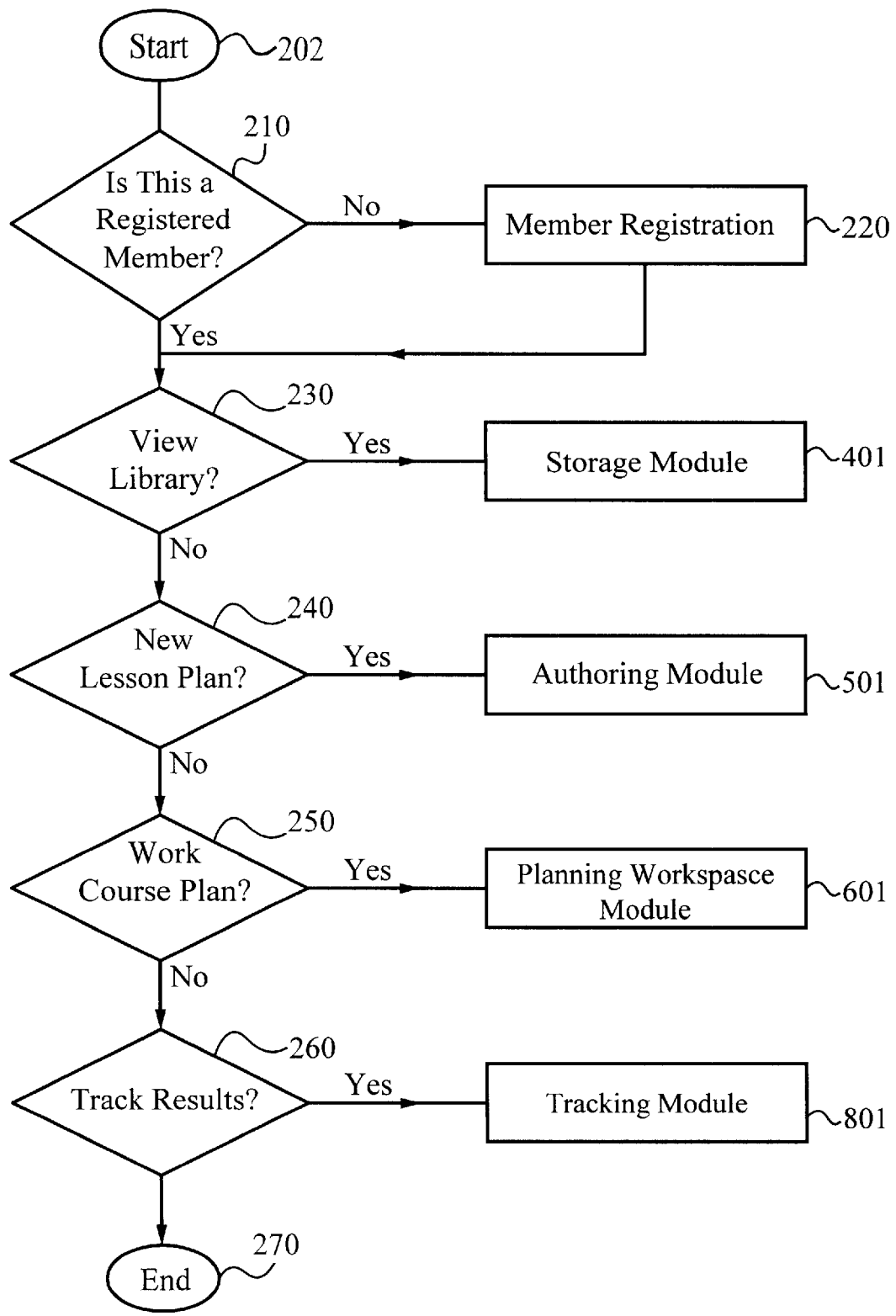
FIG. 3 illustrates a flowchart showing the process used when a user accesses the member access module of the present invention.

A flowchart illustrating the process used when a user accesses the member access module 200 is illustrated in FIG. 3. The process of FIG. 3 starts at the step 202. At the step 210 it is determined if the user currently accessing the member access module 200 is registered with the member access module 200. If the user is not yet registered with the member access module 200, then the user is registered at the step 220 by entering registration information such as name, address, telephone numbers, and email address. Once the user is registered with the member access module 200, then it is determined at the step 230 if the user would like to view the contents of the library. If it is determined at the step 230 that the user does want to view the library, then at the step 401, the process jumps to the storage module process illustrated in FIG. 6, which will be described below. If it is determined at the step 230 that the user does not want to view the library, then it is determined at the step 240 if the user would like to create a new lesson plan. If it is determined that the user would like to create a new lesson plan, then at the step 501, the process jumps to the authoring module process illustrated in FIG. 7, which will be described below. If it is determined at the step 240 that the user does not want to create a new lesson plan, then it is determined at the step 250 if the user would like to work on a course plan. If the user does want to work on a course plan, then at the step 601, the process jumps to the planning workspace module process illustrated in FIG. 8, which will be described below. If it is determined at the step 250 that the user does not want to work on a course plan, then it is determined at the step 260 if the user wants to track a result. If it is determined at the step 260 that the user does want to track a result, then at the step 801, the process jumps to the tracking module, which will be described below. If it is determined at the step 260 that the user does not want to track a result, then the member access module process ends at the step 270.

Figure 4:
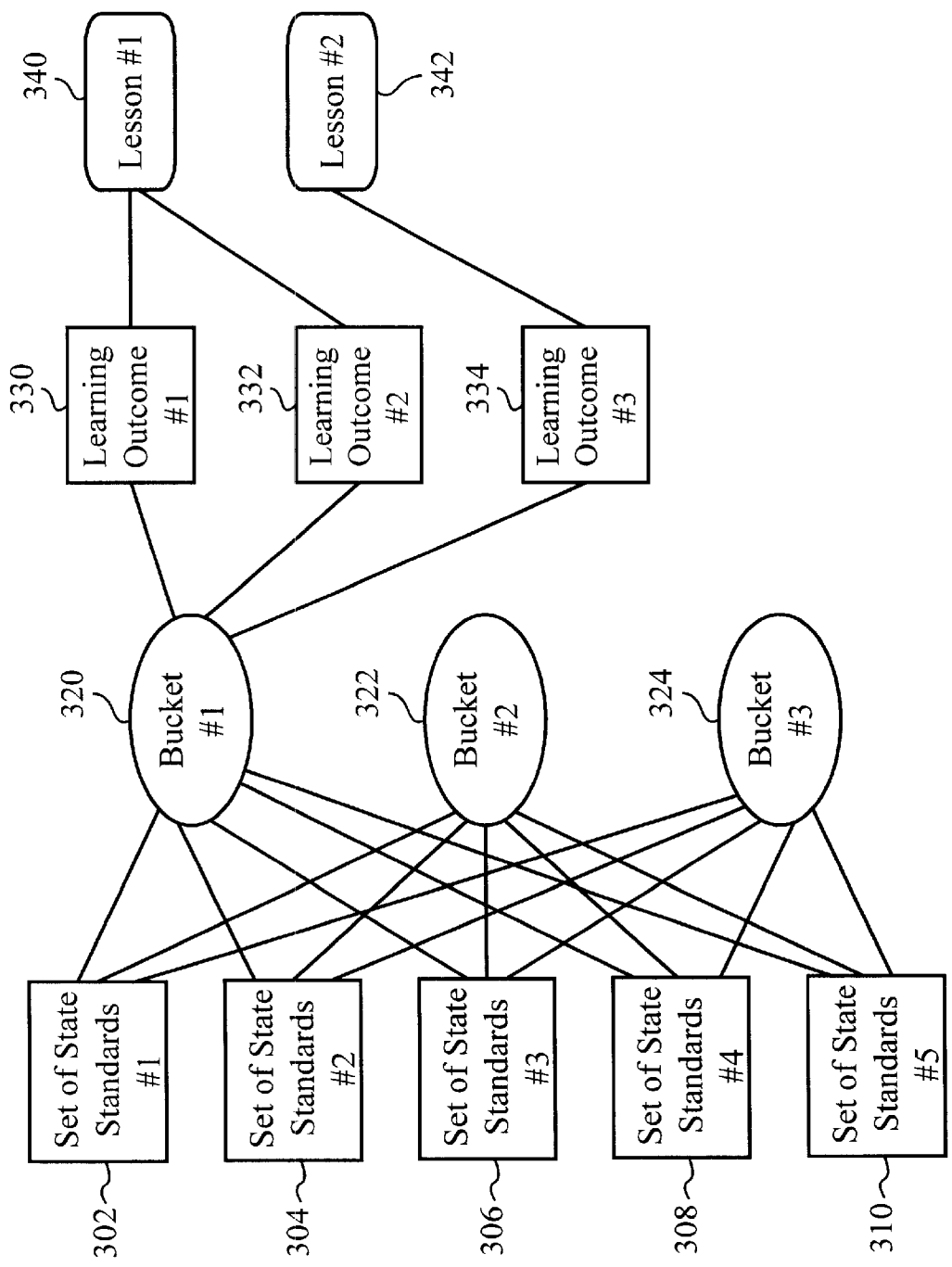
FIG. 4 illustrates a block diagram schematic of the correlating scheme according to the preferred embodiment of the present invention.

A block diagram illustrating a correlation scheme between user created lesson plans and sets of educational requirements is shown in FIG. 4. The correlation scheme facilitates the design of learning activities, or lesson plans, and their correlation to multiple sets of educational requirements. As discussed above, educational requirements include but are not limited to state educational standards, school district standards, individual school standards, private school standards, home schooling standards, and corporate education requirements. For the sake of simplifying the following description, each set of educational requirements to follow will correspond to an individual states' educational standards. Thus, each state publishes its own list of individual standards, in varying degree of specificity. Referring to FIG. 4, multiple sets of state standards are represented as the set of state standards 302, the set of state standards 304, the set of state standards 306, the set of state standards 308, and the set of state standards 310. The key to the correlation scheme is a set of conceptual containers for individual standards within the state standards. These containers, called buckets, are shown as the bucket 320, the bucket 322, and the bucket 324. The bucket 320 includes related standards from the set of state standards 302, the set of state standards 304, the set of state standards 306, the set of state standards 308, and the set of state standards 310. Similarly, the bucket 322 includes related standards from the sets of state standards 302–310 and the bucket 324 includes related standards from the sets of state standards 302–310. An individual standard included within the bucket 320 may or may not be included within the bucket 322 or the bucket 324. The standards within the buckets 320–324 are independent of the sets of state standards 302–310.

For example, each of the sets of state standards 302–310 includes some objectives relating to addition and subtraction in math. An "Addition and Subtraction" bucket is defined. For each state, particular standards relating to addition and subtraction are gathered and collected in the Addition and Subtraction Bucket. Doing so for each state produces a correlation between the Addition and Subtraction Bucket and each of the states' standards. As a result, any particular lesson plan needs only to be correlated to the appropriate buckets in order to be correlated to any individual state's standards. The lesson plans are correlated to the set of buckets, and the buckets in turn are correlated to multiple sets of state standards.

The buckets provide an intermediate layer of standards independent of any particular states' own standards. Correlation to that independent layer simplifies the process of correlating particular lesson plans to any state's standards for use by teachers within that state. For publishers of educational materials, it means correlating only once, to the buckets, rather than multiple times, to as many state standards as they want to support.

An individual lesson plan may not address the entirety of a bucket. For example, there is a bucket defined as The Solar System Bucket and one lesson plan which concentrates only on the Sun. In order to completely address The Solar System Bucket, lesson plans on the planets as well as comets, asteroids, etc. are needed. In order to not devolve to state-specific detailed standards in order to specify what part of a bucket such a lesson plan addresses, the correlation scheme calls for a state-independent level, called learning outcomes, which are shown in FIG. 4 as the learning outcome 330, the learning outcome 332, and the leaning outcome 334. The learning outcomes detail, again in a manner independent of any state's own set of standards, the contents of a bucket. The learning outcome 330, the learning outcome 332, and the learning outcome 334 specifically detail the contents of the bucket 320. Similarly, but not shown in FIG. 4, additional learning outcomes detail the contents of the bucket 322 and the bucket 324. Such a scheme provides a way for the teacher to analyze what is addressed and what is left to be addressed within a required bucket.

The learning outcomes add a second level to the correlation scheme for authored and published lesson plans. In order to provide the level of detailed correlation available at the learning outcome level, authors need to correlate their lesson plans to those particular learning outcomes addressed within the appropriate bucket. Referring to FIG. 4, the lesson 340 and the lesson 342 are instances of individual lesson plans. The lesson 340 correlates to the learning outcome 330 and the learning outcome 332. The lesson 342 correlates to the learning outcome 334. As shown above, lesson plans have both a one-to-one correlation and a one-to-many correlation with learning outcomes.

Some state standard sets contain learning objectives down to a fine level of detail and some do not. For those that do, the learning outcomes provide a way for lesson plans to be analyzable to a level of detail sufficient to guarantee alignment with those state's most detailed level of standards. For those that do not, the learning outcomes provide a deeper level of analysis than would otherwise be available. Thus, in either case, the teacher has available, regardless of the origin of the lesson plans themselves, a deep level of analysis for discovering what has been and what has not been addressed in regard to learning objectives.

Figure 5:
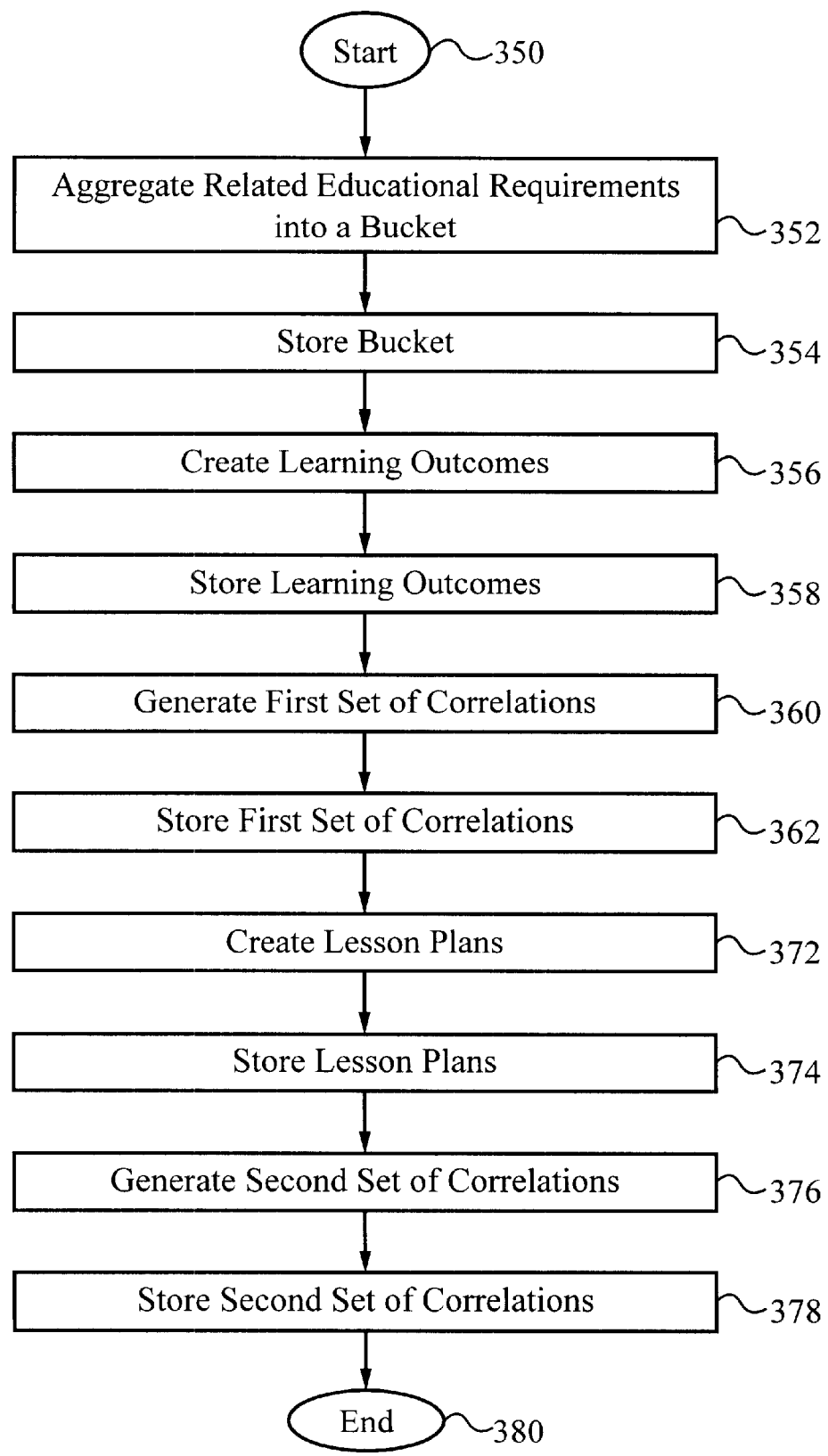
FIG. 5 illustrates a flowchart showing the correlating module process used in accordance with the correlating scheme illustrated in FIG. 4.

A flowchart illustrating the correlating module process associated with the correlating scheme described in FIG. 4 is illustrated in FIG. 5. The correlating module process starts at the step 350. At the step 352, related educational requirements from the multiple sets of educational requirements are aggregated into a grouping of educational requirements. A grouping corresponds to a bucket as described above in reference to FIG. 4. Specifically, the bucket 320, the bucket 322, and the bucket 324 are each a grouping of educational requirements. At the step 354, the bucket is stored in a storage device. Preferably the storage device is a database which is coupled to the correlating server. Alternatively, the storage device can be any appropriate conventional storage medium. The bucket's data record includes a subject of the bucket and a grade level to which the bucket is applied. At the step 356, the grouping is consolidated and recast into a set of educational components. An educational component corresponds to a learning outcome as described above in reference to FIG. 4. Specifically, the learning outcome 330, the learning outcome 332, and the learning outcome 334 are each educational components. At the step 358, the learning outcomes are stored in the database. The learning outcome's data record includes the bucket to which it belongs. At the step 360, a first set of correlations is generated by correlating the learning outcomes to the bucket which essentially correlates the learning outcomes to the multiple sets of educational requirements. At the step 362, the first set of correlations is stored in the database.

At the step 372, the lesson plans are created. The lesson plans are created in the authoring module 500, which will be described below. At the step 374, the lesson plans are stored in the database. At the step 376, a second set of correlations is generated by correlating the lesson plans to the learning outcomes. The second set of correlations in combination with the first set of correlations essentially correlates the lesson plans to the multiple sets of educational requirements. At the step 378, the second set of correlations is stored in the database. The correlating module process then ends at the step 380.

The process described above in relation to FIG. 5 depicts a process whereby one bucket is generated. It should be clear to someone skilled in the art that the process can be equally applied to the generation of any number of buckets and corresponding learning outcomes. In this manner, the multiple sets of educational requirements can be grouped into numerous buckets where each bucket includes related educational requirements. Consequently, lesson plans can be created to satisfy multiple sets of learning outcomes, where each set of learning outcomes satisfies a corresponding bucket.

Figure 6:
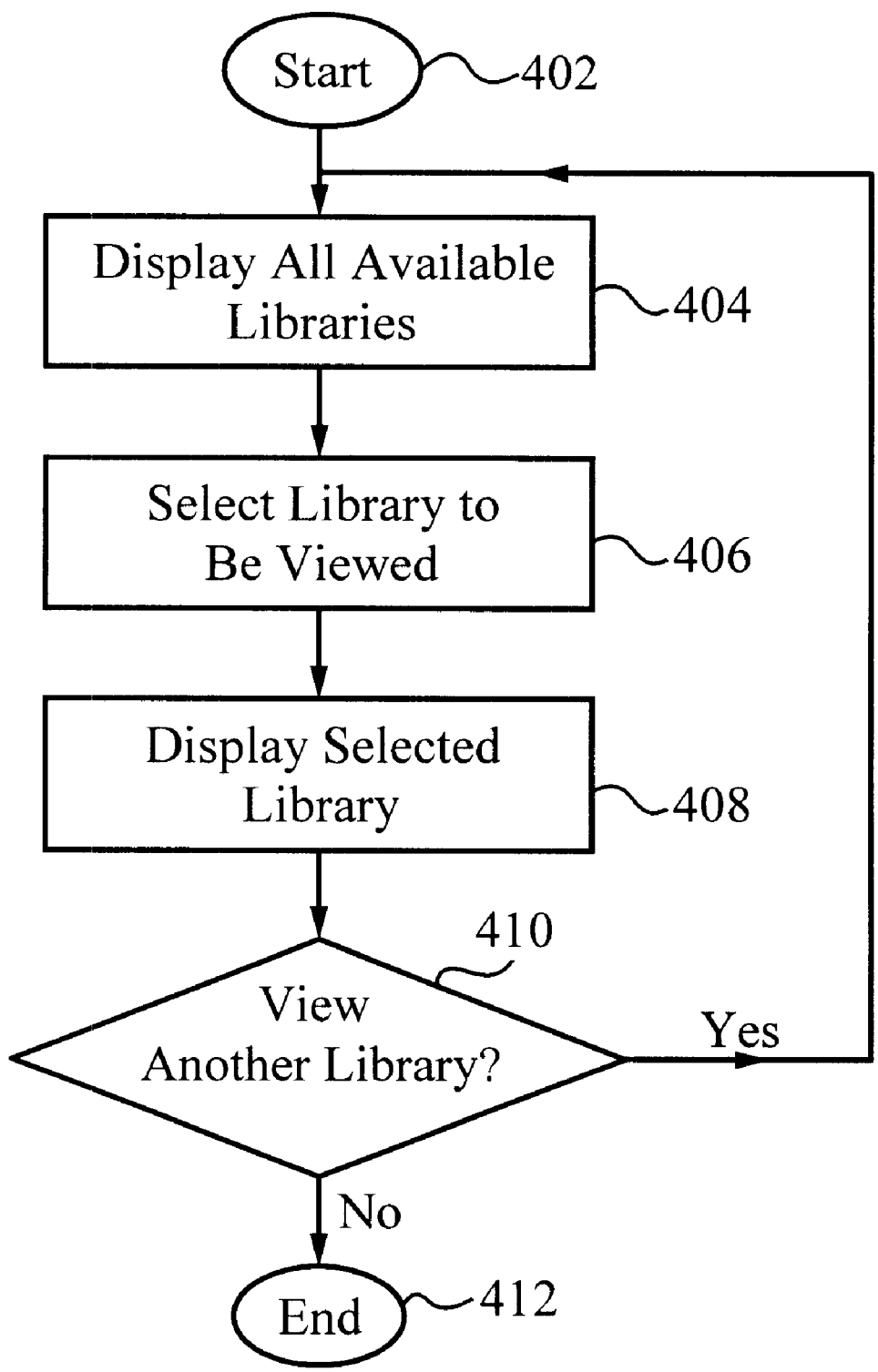
FIG. 6 illustrates a flowchart showing the storage module process of the present invention.

The flowchart illustrating the storage module process of the present invention is illustrated in FIG. 6. The storage module 400 includes a standards library, a lesson plans library, a learning outcomes library, and a buckets library where the user is able to select and view the content of the various libraries. The standards library includes sets of standards, e.g. state educational standards, to be addressed by teacher's plans. These standards are correlated to the buckets as described above. Teachers have the ability to consult the standards library directly to view their relevant standards, although it is not necessary for them to do so in order to assure that they have addressed them in their lesson plans. The lesson plans library, the learning outcomes library, and the buckets library include available lesson plans, learning outcomes, and buckets respectively. Teachers have the ability to search for lesson plans by various criteria including learning outcomes or buckets addressed by the lesson plans and import lesson plans into their own planning workspaces. Planning workspaces will be described in detail below.

The storage module process starts at the step 402. At the step 404, a list of all available libraries is displayed. At the step 406, the user selects the desired library to be viewed, and at the step 408, the selected library is displayed. At the step 410, it is determined if the user wants to view another library. If it is determined at the step 410 that the user does want to view another library, then the process jumps back to the step 404, where the list of all available libraries is displayed. If it is determined at the step 410 that the user does not want to view another library, then the storage module process ends at the step 412.

Figure 7:
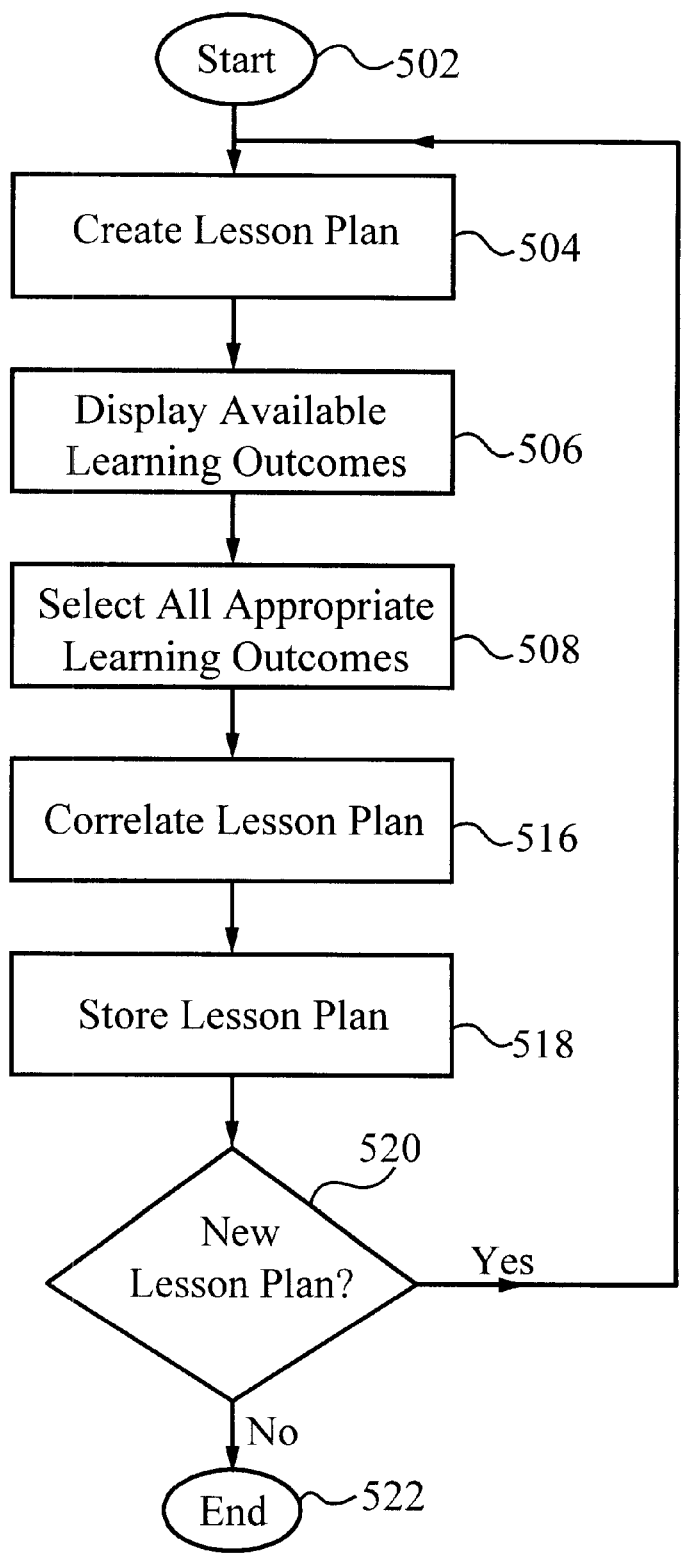
FIG. 7 illustrates a flowchart showing the authoring module process of the present invention.

A flowchart illustrating the authoring module process is illustrated in FIG. 7. The authoring module 500 includes an authoring tool to allow users to create new learning materials, or lesson plans. Within the authoring tool, lesson plans are correlated directly to buckets and learning outcomes, and thereby correlated indirectly to whatever sets of standards individual teachers and schools may need to address. When users create a new lesson plan, they select buckets and learning outcomes addressed by the new lesson plan. The correlation is recorded in the lesson plan library database record for that lesson plan.

The authoring module process starts at the step 502. At the step 504, the user creates a new lesson plan. At the step 506, a list of available learning outcomes is displayed, and at the step 508, the user chooses the appropriate learning outcomes to which the new lesson plan will be correlated. At the step 516, the new lesson plan is correlated to the chosen learning outcomes, and at the step 518 the new lesson plan is stored in the database. Each lesson plan's data record includes a subject of the lesson plan, a grade level to which the lesson plan is applied, and the learning outcomes addressed by the lesson plan. At, the step 520, it is determined if the user wants to create another new lesson plan. If it is determined at the step 520 that the user does want to create another new lesson plan, then the process jumps back to the step 504, where the user creates a new lesson plan. If it is determined at the step 520 that the user does not want to create another new lesson plan, then the authoring module process ends at the step 522.

Figure 8A:
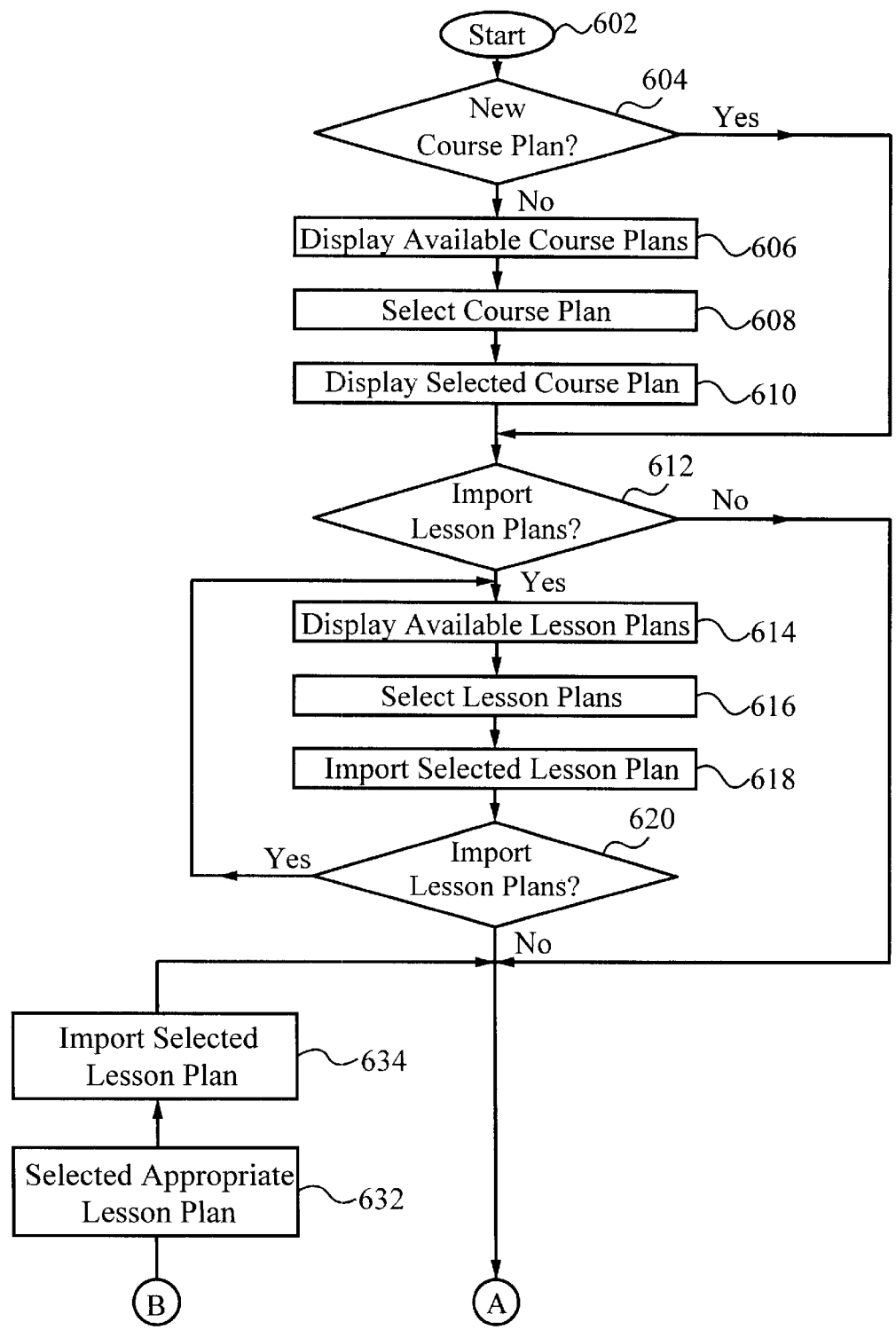
FIG. 8 illustrates a flowchart showing the planning workspace module process of the present invention.
Figure 8B:
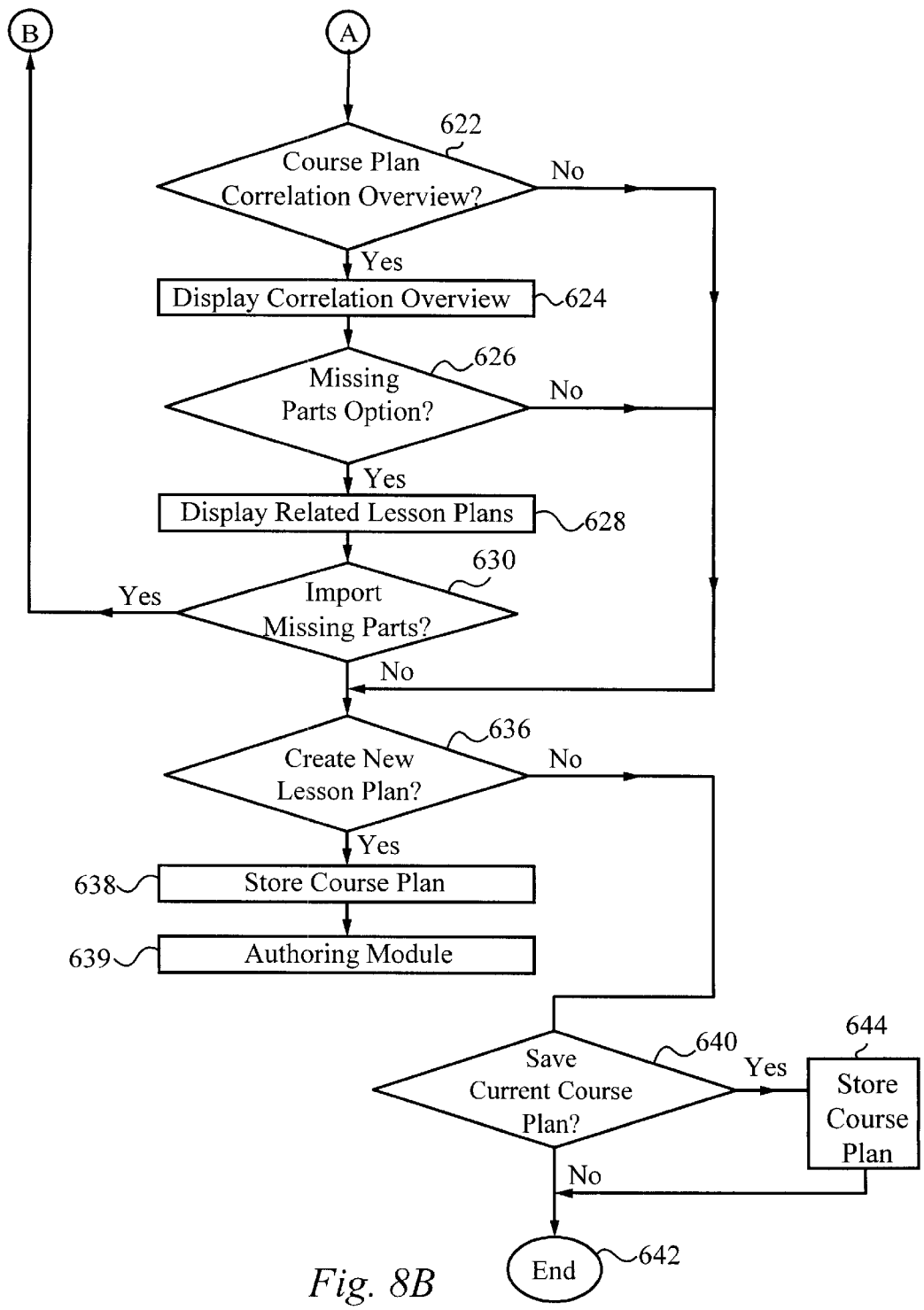

A flowchart illustrating the planning workspace module process is illustrated in FIG. 8. A planning workspace is used by users to gather learning materials together into a course plan and to get an overview of the course plan's coverage of relevant buckets and specific learning outcomes within them. The planning workspace module process starts at the step 602. At the step 604, it is determined if the user wants to create a new course plan. If it is determined at the step 604 that the user does not want to create a new course plan, then a list of available course plans is displayed at the step 606. At the step 608, the user selects a course plan to be displayed, and at the step 610, the selected course plan is displayed. If it is determined at the step 604 that the user does want to create a new course plan or after the selected course plan has been displayed at the step 610, then it is determined if the user wants to import an existing lesson plan into the planning workspace. If a user selects a previously authored lesson plan for inclusion in the planning workspace, the lesson plan appears with its correlation data. If it is determined that the user does want to import an existing lesson plan, then a list of available lesson plans to be imported is displayed at the step 614. At the step 616, the user selects a lesson plan to be imported, and at the step 618, the selected lesson plan is imported into the planning workspace. At the step 620, it is determined if the user wants to import another lesson plan. If it is determined at the step 620 that the user wants to import another lesson plan, then the process jumps back to the step 614 where the list of available lesson plans to be imported is displayed. If it is determined at the step 620 that the user does not want to import another lesson plan or if it is determined at the step 612 that the user does not want to import an existing lesson plan, then at the step 622, it is determined if the user wants to view a course plan correlation overview. When the lesson plan is imported into the planning workspace, its correlation data, along with other lesson plans in the planning workspace, provides an overview of the coverage of relevant buckets and learning outcomes for the course plan currently being created in the planning workspace. If it is determined at the step 622 that the user wants to view the course plan correlation overview, then the course plan correlation overview is displayed at the step 624. At the step 626, it is determined if the user wants to view a list of lesson plans that correlate to the missing parts of the correlation overview. Where holes, or missing parts, appear in the course plan correlation coverage, the user can select the bucket and particular learning outcomes that have not been satisfied, and search for a lesson plan from the lesson plan library that will address the missing learning outcomes. As discussed above, the standards library contains each state's own set of learning standards. Normally, teachers will not need to consult this library. The buckets and learning outcomes displayed in the course plan and planning workspace screens will allow the teacher to build and oversee a course plan that addresses buckets correlated to the relevant standards within the selected state's standards. Each bucket's data includes information about which standards it contains for each particular standards set in the standards library database.

If it is determined at the step 626 that the user wants to display the lesson plans correlating to the missing parts, then at the step 628, the lesson plans correlating to the missing parts of the correlation overview are displayed. At the step 630, it is determined if the user wants to import a lesson plan that correlates to a missing part within the correlation overview. If it is determined at the step 630 that the user wants to import a lesson plan that correlates to a missing part, then at the step 632, the user selects the appropriate lesson plan to be imported. At the step 634, the selected lesson plan is imported into the planning workspace and the process jumps back to the step 622 to determine if the user wants to view the course plan correlation overview. If it is determined at the step 630 that the user does not want to import a lesson plan correlating to a missing part, or if it is determined at the step 626 that the user does not want to display the lesson plans correlating to the missing parts, or if it determined at the step 622 that the user does not want to view the course plan correlation overview, then at the step 636, it is determined if the user wants to create a new lesson plan to be included in the current course plan. If it is determined that the user does want to create a new course plan at the step 636, then the current course plan is stored in the database at the step 638. At the step 639, the process jumps to the authoring module process. If it is determined at the step 636 that the user does not want to create a new lesson plan, then it is determined at the step 640 if the user wants to save the current course plan displayed in the planning workspace. If it is determined at the step 640 that the user wants to save the current course plan, then at the step 641, the current course plan is stored in the database. If it is determined at the step 640 that the user does not want to save the current course plan, or after the current course plan has been stored at the step 641, then at the step 642 the planning workspace module process ends.

Referring to FIG. 1, the tracking module 800 provides the ability to record and view student performance needs. The student records themselves will be correlated to lesson plans so that an indirect correlation can be made between the student records and learning outcomes. Thus, if a student were to score an "A" on a particular lesson plan's work, and that lesson plan was correlated to learning outcomes 1, 2, and 3, the student would have earned an "A" on the objectives expressed in those learning outcomes. In this way, the correlating system of the present invention provides the basis for an integrated lesson planning and student assessment system.

As discussed above, the preferred embodiment of the correlating system of the present invention correlates lesson plans and state educational standards for K-12 public schools in the United States. It should be understood that the correlating system of the present invention is not limited to this type of correlation. The basic idea is one for linking learning materials to arbitrary learning objectives. That idea is applicable to corporate training and certification programs, home schooling, private education and anywhere it is valuable to align learning materials to objectives. The particular correlation scheme described herein is valuable anywhere multiple sets of learning objectives need to be correlated to learning materials or activities.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is accessible over the internet through the public switched telephone network, the present invention could also be accessible on any other appropriate communication structures both wired and wireless, including cable, intranets, direct connections and the like.

What is claimed is:

1. A method of generating a correlation between a plurality of sets of educational requirements and learning activities, comprising the steps of:
   a. aggregating educational requirements from one or more of the sets of educational requirements into a grouping of educational requirements having a common factor;
   b. generating a set of educational components including the educational requirements within the grouping;
   c. correlating the set of educational components to the grouping of educational requirements to generate a first set of correlations; and
   d. correlating a learning component of the learning activities to one or more educational components of the set of educational components to generate a second set of correlations.

2. The method as claimed in claim 1 wherein the steps of correlating the set of educational components to the grouping of educational requirements and correlating the learning component of the learning activities to the set of educational components are performed by a server.

3. The method as claimed in claim 2 wherein the step of correlating the learning component of the learning activities to one or more educational components of the set of educational components further comprises the step of manually selecting the educational components to which the learning component is correlated.

4. The method as claimed in claim 3 wherein the grouping, the set of educational components, the first set of correlations, and the second set of correlations are stored on a storage device coupled to the server.

5. The method as claimed in claim 4 wherein the storage device is a database.

6. The method as claimed in claim 5 wherein the database is distributed into more than one physical location.

7. The method as claimed in claim 2 further comprising the step of establishing an internet connection with the server to provide and select the learning components to be correlated.

8. The method as claimed in claim 7 wherein the internet connection is established with a computer system at a remote location from the server.

9. The method as claimed in claim 1 wherein the learning components of the learning activities are lesson plans generated by teachers or authors.

10. The method as claimed in claim 1 wherein the learning components are generated by an authoring tool coupled to the storage device.

11. The method as claimed in claim 1 wherein a set of educational requirements is a set of state educational standards.

12. The method as claimed in claim 1 wherein a set of educational requirements is a set of school district educational standards.

13. The method as claimed in claim 1 wherein a set of educational requirements is a set of corporate training requirements.

14. The method as claimed in claim 1 wherein a set of educational requirements is a set of certification requirements.

15. A method of identifying educational requirements within a plurality of sets of educational requirements correlated to a learning component of a learning activity, comprising the steps of:
   a. aggregating educational requirements from one or more of the sets of educational requirements into a grouping of educational requirements having a common factor;
   b. generating a set of educational components including the educational requirements within the grouping;
   c. correlating the set of educational components to the grouping of educational requirements to generate a first set of correlations;
   d. correlating the learning component of the learning activities to one or more educational components of the set of educational components to generate a second set of correlations;
   e. identifying educational components within the set of educational components by applying the second set of correlations to the learning component of the learning activities; and
   f. identifying educational requirements within the grouping of educational requirements by applying the first set of correlations to the identified educational components of the set of educational components.

16. The method as claimed in claim 15 wherein the steps of correlating the set of educational components to the grouping of educational requirements and correlating the learning component of the learning activities to the set of educational components are performed by a server.

17. The method as claimed in claim 16 wherein the step of correlating the learning component of the learning activities to one or more educational components of the set of educational components further comprises the step of manually selecting the educational components to which the learning component is correlated.

18. The method as claimed in claim 16 wherein the steps of identifying educational components and identifying educational requirements are performed by the server.

19. The method as claimed in claim 16 wherein the grouping, the set of educational components, the first set of correlations, and the second set of correlations are stored on a storage device coupled to the server.

20. The method as claimed in claim 19 wherein the storage device is a database.

21. The method as claimed in claim 20 wherein the database is distributed into more than one physical location.

22. The method as claimed in claim 19 wherein the learning component is generated by an authoring tool wherein the authoring tool is coupled to the storage device.

23. The method as claimed in claim 22 further comprising the step of establishing an internet connection with the server to utilize the authoring tool.

24. The method as claimed in claim 16 further comprising the step of establishing an internet connection with the server to select the learning component to be correlated.

25. The method as claimed in claim 15 wherein the learning component of the learning activities is a lesson plan generated by teachers or authors.

26. A correlating system for generating correlations between a plurality of sets of educational requirements and learning activities, comprising:
   a. means for aggregating educational requirements from one or more of the sets of educational requirements into a grouping of educational requirements having a common factor;
   b. means for generating a set of educational components including the educational requirements within the grouping;

c. means for correlating the set of educational components to the grouping of educational requirements to generate a first set of correlations; and d. means for correlating a learning component of the learning activities to one or more educational components of the set of educational components to generate a second set of correlations.

27. The correlating system as claimed in claim 26 wherein the means for generating sets of correlations is included within a server.

28. The correlating system as claimed in claim 27 wherein the means for correlating a learning component of the learning activities to one or more educational components of the set of educational components further comprises means for manually selecting the educational components to which the learning component is correlated.

29. The correlating system as claimed in claim 28 wherein a connection is established with a computer system and the server to access the correlating system and to provide and select the learning components to be correlated.

30. The correlating system as claimed in claim 29 wherein the connection is established between the computer system and the server over the internet.

31. The correlating system as claimed in claim 27 further comprising means for storing the grouping, the set of educational components, the first set of correlations, and the second set of correlations.

32. A correlating system for generating correlations between a plurality of sets of educational requirements and learning activities, comprising:

a. an interface circuit configured to establish a connection with a remote computer system; and b. a correlating server coupled to the interface circuit to aggregate educational requirements from one or more of the sets of educational requirements into a grouping of educational requirements having a common factor, provide a set of educational components, correlate the set of educational components to the grouping of educational requirements to generate a first set of correlations, and correlate a learning component of the learning activities to one or more educational components of the set of educational components to generate a second set of correlations.

33. The correlating system as claimed in claim 32 further comprising a storage device coupled to the correlating server to store the grouping, the set of educational components, the first set of correlations, and the second set of correlations.

34. The correlating system as claimed in claim 33 wherein the connection is established with the remote computer system and the interface circuit over the internet to allow users to access the correlating server and to provide and select the learning components to be correlated.

35. A network of devices for generating correlations between a plurality of sets of educational requirements and learning activities, comprising:

a. one or more computer systems configured to communicate with other systems; and b. a correlating server configured to couple to the one or more computer systems to aggregate educational requirements from one or more of the sets of educational requirements into a grouping of educational requirements having a common factor, provide a set of educational components, correlate the set of educational components to the grouping of educational requirements to generate a first set of correlations, and correlate a learning component of the learning activities to one or more educational components of the set of educational components to generate a second set of correlations.

36. The network of devices as claimed in claim 35 further comprising a storage device coupled to the correlating server to store the grouping, the set of educational components, the first set of correlations, and the second set of correlations.

37. The network of devices as claimed in claim 36 wherein the one or more computer systems and the correlating server are coupled together over the internet to allow users to access the correlating server and to provide and select the learning components to be correlated.

38. A method of generating a correlation between a learning component of a learning activity and a plurality of sets of educational requirements, comprising the steps of:

a. selecting one or more educational components to which the learning component is correlated;

b. correlating the learning component to the selected educational components to generate a first set of correlations;

c. correlating the selected educational components to one or more groupings of educational requirements having a common factor to generate a second set of correlations; and d. correlating the one or more groupings to the plurality of sets of educational requirements to generate a third set of correlations.

39. The method as claimed in claim 38 wherein the step of selecting one or more educational components is performed manually.

40. The method as claimed in claim 39 wherein the steps of correlating the learning component to the selected educational components, correlating the selected educational components to one or more groupings of educational requirements having a common factor, and correlating the one or more groupings to the plurality of sets of educational requirements are performed by a server.

41. The method as claimed in claim 40 wherein the selected educational components, the first set of correlations, the second set of correlations, and the third set of correlations are stored on a storage device coupled to the server.

42. The method as claimed in claim 41 further comprising the step of establishing an internet connection with the server to select the educational components to be correlated.

43. The method as claimed in claim 38 wherein the learning component of the learning activities is a lesson plan generated by teachers or authors.

* * * * *